United States Patent Office 2,921,884
Patented Jan. 19, 1960

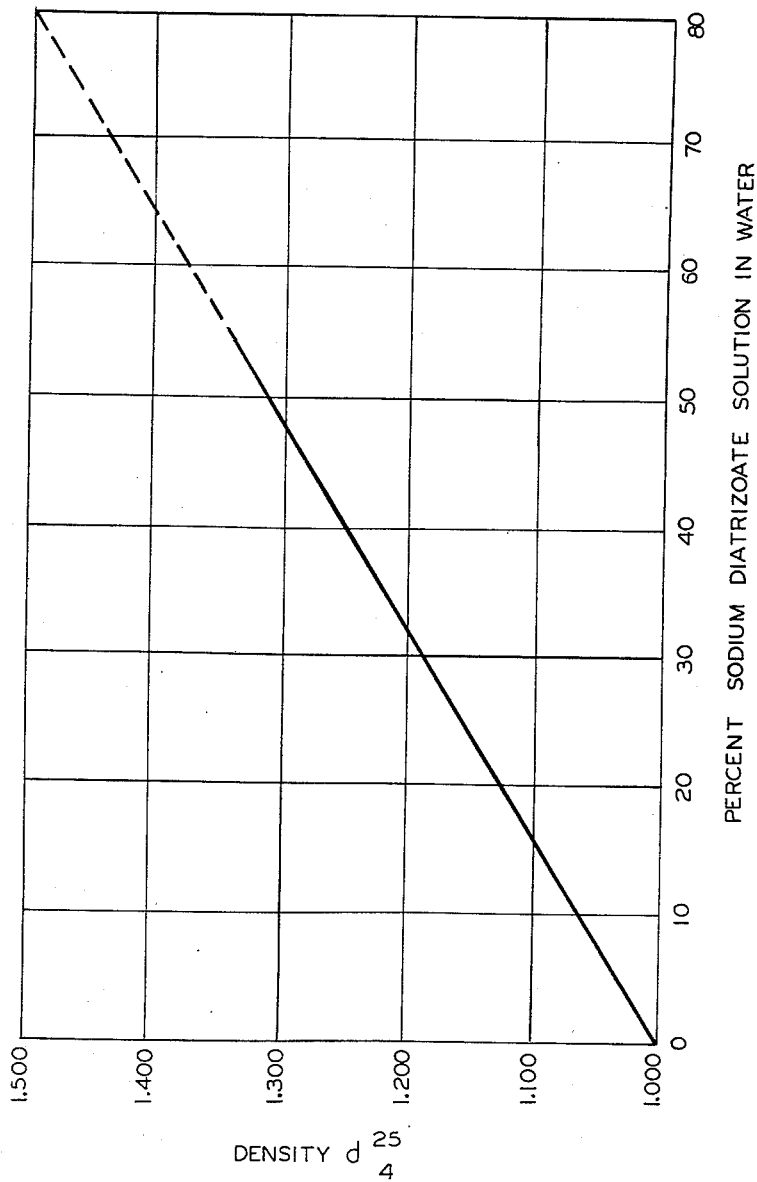

2,921,884

PHARMACEUTICAL COMPOSITIONS

Frederick C. Nachod, Kinderhook, James O. Hoppe, Bethlehem, and Johannes S. Buck, deceased, late of Albany, N.Y., by Phillis G. Buck, executrix, Albany, N.Y., assignors to Sterling Drug Inc., New York, N.Y., a corporation of Delaware Application September 30, 1957, Serial No. 687,165

11 Claims. (Cl. 167—82)

This invention relates to stable suspensions of solids in liquids which are useful in the art of pharmacy.

Our invention resides in the concept of: incorporating a substantially pharmacologically inert solute, containing in its molecular structure at least one bromine or iodine atom and having a density above about 1.1 g./cc., into the liquid phase of a suspension of a comminuted, solid pharmaceutical substance, thereby to render the suspension stable by decreasing the difference between the densities of the suspended particles of solid and the suspending medium. Said suspending medium can be either aqueous or non-aqueous.

The compositions of the invention are stable suspensions adapted to be administered to mammals in non-toxic dosages, comprising: (a) a dispersed solid substance having a density above 1.0 g./cc.; and a dispersion medium including (b) a liquid having a density less than said solid, and (c) a compound dissolved in said liquid and containing in its molecular structure at least one bromine or iodine atom.

The above compositions are of two general types: (A) suspensions wherein the liquid of the dispersing medium is water; and (B) wherein the liquid of the dispersing medium is non-aqueous.

In formulations of type A, the solute is one which is sufficiently water-soluble and has sufficient bromine or iodine content to increase the density of the solution appreciably above 1.0 g./cc., while being essentially innocuous in its physiological action. Inorganic iodides such as sodium iodide can be used. However, preferred solutes for the purpose are the salts of polyiodinated derivatives of aromatic acids, which have been developed for use in the radiopaque field for urographic diagnosis. Exemplary of these iodinated derivatives are the diethanolamine salt of 3,5-diiodo-4-pyridone-N-acetic acid (iodopyracet); the sodium salt of 3-acetylamino-2,4,6-triiodobenzoic acid (acetrizoic acid); the sodium or N-methylglucamine salt of 3,5 - diacetylamino-2,4,6-triiodobenzoic acid (diatrizoic acid), sodium iodomethamate, and the like. The corresponding bromine analogs, e.g., salts of 3,5-dibromo-4-pyridone-N-acetic acid, 3-acetylamino-2,4,6-tribromobenzoic acid, and the like, can also be used, although they are less efficient in increasing density than are the iodine analogs. With these substances it is possible to prepare aqueous solutions of any desired density between 1.0 and about 1.5 g./cc. If the density of a given solute in weight percent relative to the total volume of solution is plotted against concentration a straight line relationship is observed. The accompanying drawing is a plot of density versus concentration for sodium diatrizoate. The concentration of solute necessary to obtain a desired density is readily determined from the graph, and similar graphs can be prepared for other solutes. Referring to the drawing, solutions of sodium diatrizoate above about 55–57 percent are supersaturated and therefore not practical for use in our suspensions. However, stable solutions of concentration greater than 55–57 percent (up to about 80 percent) can be obtained using the N-methylglucamine salt instead of the sodium salt of diatrizoic acid, or mixtures of both salts.

Formulations of type A are applicable to any medicinal or diagnostic agent to be administered intravenously, subcutaneously, intramuscularly, or by instillation into a body cavity. They are particularly useful in the formulation of hormone preparations, for example, steroid hormones such as testosterone, estrone, progesterone, cortisone, hydrocortisone, and the like. Another particularly valuable application is the case where the suspended material is any water-insoluble, solid radiopaque substance; this provides a suspension which is useful in the field of hepatolienography (visualization of the liver and spleen) upon intravenous administration.

The pharmaceutical substance to be suspended can be any medicinal or diagnostic agent, or an intimate mixture of two or more such agents, which are in the solid state and are substantially, although not necessarily completely, insoluble in the suspending medium. The exact nature of the medicinal or diagnostic agent is not critical, although the invention is primarily useful in the case of agents to be administered parenterally (intravenously, subcutaneously, intramuscularly, etc.), or by direct instillation into a body cavity, as in the case of an X-ray contrast agent (radiopaque). Exemplary of the types of pharmaceutical substances which can be used in our invention are hormones, vitamins, antibiotics and X-ray contrast agents.

The suspended solid material need not be homogeneous, but can be a mixture of two or more compounds, often useful in the case of hormonal formulations. The mixed substances are finely divided and intimately mixed, and in general have nearly the same density, so there is no tendency for the components to separate.

Ideally, the densities of the dispersed solid substance and the dispersing medium are equal. However, it is not necessary, and in some instances not possible, to have the density of the suspended solid material and the suspending medium exactly equal. In the case of some radiopaque suspensoids the solid may have a density greater than that of the most concentrated solution of iodinated solute available; however, such systems are within the purview of the invention and are useful, since it is still possible to produce a stable suspension, particularly upon addition of emulsifying or thickening agents. In the case of hormone suspensoids, however, it is generally possible to have the densities of solid and liquid substantially equal.

In formulations of type B a solid pharmaceutical substance is suspended in a therapeutically acceptable non-aqueous liquid, such as sesame oil, peanut oil, poppyseed oil or the like, in which said pharmaceutical substance is essentially insoluble, and a denser, miscible oil or soluble solid is added until the density of the medium approximately matches that of the suspensoid. The denser oil or solid is a brominated or iodinated substance which is essentially innocuous to the animal organism. Particularly useful substances for this purpose are the iodinated oils commonly used as X-ray contrast media for diagnosis of the spinal canal (myelography) or bronchial tree (bronchography), such as iodized poppyseed oil, esters of iodinated stearic acid, ethyl iodophenylundecylate, or any therapeutically acceptable iodinated liquid miscible with the susepnding medium.

Formulations of type B find particular application in the field of bronchography wherein the suspended solid is a radiopaque substance. In this case, both the suspensoid and the suspending medium contribute to the visualization.

The formulations are prepared by mixing the finely divided solid pharmaceutical material and the ingredients of the suspending medium in any order. It is helpful but not prerequisite to know the density of the solid. If it is known, the concentration of the solute in the suspending medium necessary to provide approximately the same density can readily be determined from a plot like the accompanying drawing. If the density of the solid is unknown, the proper concentration of solute can be determined by trial and error, adjusting the concentration until a permanent suspension is obtained.

The operation of our invention is not dependent upon the size of the particles of the suspended solid, although the substance should be relatively finely divided with particle sizes between about 1 and 100 microns. In formulations of types A and B which are utilized in hepatolienography or bronchography, for optimum results the particle size of the suspended radiopaque substance should be as small as can be obtained with conventional equipment. The practical range of average particle size is about 1 to 10 microns as obtained by fluid jet pulverization.

The rheological properties of formulations of types A and B can be adjusted by varying the solid-liquid ratios or by the addition of other substances such as thickening agents, emulsifying agents, and the like.

The following examples will further illustrate our invention without the latter being limited thereby.

Example 1

A hormone suspension of a finely divided, intimate mixture of 25 mg. of estrone and 500 mg. of testosterone, containing also 0.1% carboxymethyl methylcellulose, 0.2% of sodium chloride and 0.002% of sodium ethylmercurithiosalicylate as a preservative in 10 cc. of water was adjusted in density by addition of 50% aqueous solution of the sodium salt of 3,5-diacetamido-2,4,6-triiodobenzoic acid until the concentration of this compound amounted to 28.75%. At this point the suspending fluid had a density of 1.175 g./cc. and the hormone particles remained in permanent suspension, providing a formulation suitable for parenteral administration.

Example 2

A hormone suspension of a finely divided, intimate mixture of 19 mg. of estrone and 1 mg. of equilin in 10 cc. of water was adjusted in density to a value of 1.208 g./cc. by adding sodium 3,5-diacetamido-2,4,6-triiodobenzoate so that the latter was present in the amount 34.40% by weight. A permanent suspension was thus obtained, suitable for parenteral administration.

Example 3

A suspension for intramuscular administration of 250 mg. of finely divided testosterone in 10 cc. of water was adjusted in density to 1.180 g./cc. by adding the sodium salt of 3,5-diacetamido-2,4,6-triiodobenzoic acid so that its concentration was 29.0%, resulting in a permanently poised suspension.

In the preceding example the testosterone can be replaced by cortisone or hydrocortisone and the concentration of iodinated salt adjusted to produce permanent suspensions.

Example 4

A hormone preparation containing a finely divided, intimate mixture of 250 mg. of testosterone, 250 mg. of progesterone and 12 mg. of estradiol was prepared by suspending the mixture in an aqueous solution containing 25.2% of sodium 3,5-diacetamido-2,4,6-triiodobenzoate, said solution having a density of 1.155 g./cc. A permanent suspension was thus obtained, suitable for parenteral administration.

Example 5

2 - hydroxyethyl 3,5 - diacetamido - 2,4,6 - triiodobenzoate (40.0 g., prepared by reacting sodium 3,5-diacetamido - 2,4,6 - triiodobenzoate and ethylene bromohydrin as described in the copending application of A. A. Larsen, Serial No. 653,289, filed April 17, 1957) was added to a 500 ml. ground-glass stoppered bottle half full of 3 mm. glass beads, and then 0.2 ml. of Tween 20 (Atlas Powder Company, condensation product of ethylene oxide and sorbitan monolaurate) in 150 ml. of water was added, and the mixture was ball-milled for eighteen hours. Sodium 3,5-diacetamido-2,4,6-triiodobenzoate (110 g.) and sufficient water to give a total volume of 200 ml. were added, the mixture was ball-milled again for twenty-two hours and the pH adjusted to 7.2 with 1 N hydrochloric acid. The resulting solution was sterilized and tested for hepatolienography in rabbits. Upon intravenous injection the suspension clearly outlined the liver and spleen on X-ray photographs.

Example 6

The calcium salt of α-ethyl-β-(3,5-diiodo-4-aminophenyl)propionic acid (20 parts by weight, density 1.24 g./cc.) was micronized and suspended in 100 parts by volume of an aqueous solution containing 40% by weight of the N-methylglucamine salt of 3,5-diacetamido-2,4,6-triiodobenzoic acid, giving a stable suspension which visualized the liver and spleen upon intravenous administration.

Example 7

The ethyl ester of 3,5-diacetamido-2,4,6-triiodobenzoic acid (20 parts by weight) was micronized and suspended in 100 parts by volume of an aqueous solution containing 35% by weight of the diethanolamine salt of 3,5-diiodo-4-pyridone-N-acetic acid containing 0.05% by weight of Tween 20, giving a stable suspension which upon intravenous administration to rabbits demonstrated successful visualization of the liver and spleen.

Example 8

The ethyl ester of 3,5-diacetamido-2,4,6-triiodobenzoate (60 parts by weight) was micronized and suspended in a mixture of 70 parts by volume of sesame oil and 30 parts by volume of β-ethoxyethyl p-iodobenzoate, giving a stable suspension useful in visualizing the bronchial tree.

The invention is not restricted to the preceding examples but can be applied to the formulation of suspensions of other hormones, radiopaques, vitamins, antibiotics and the like. For instance, a suspension of procaine penicillin in aqueous sodium acetrizoate (3-acetamido-2,4,6-triiodobenzoate), suitable for parenteral administration, can be prepared according to the methods of the preceding examples.

We claim:

1. A stable suspension adapted to be administered to mammals in non-toxic dosages, comprising: (a) a dispersed solid substance selected from the group consisting of medicinal and diagnostic agents having a density above 1.0 g./cc. and having a particle size between about 1 and 100 microns; and a dispersion medium including (b) a liquid having a density less than said solid, and (c) a compound dissolved in said liquid and containing in its molecular structure at least one atom selected from the group consisting of bromine and iodine, the concentration of said compound in said liquid being such that the difference between the densities of said dispersed solid and the liquid phase are substantially decreased.

2. A stable suspension adapted to be administered to mammals in non-toxic dosages, comprising: (a) a dispersed solid substance selected from the group consisting of medicinal and diagnostic agents having a density above 1.0 g./cc. and having a particle size between about 1 and 100 microns; and a dispersion medium including (b) water and (c) a compound dissolved in said water and containing in its molecular structure at least one iodine atom, the concentration of said compound in said liquid being such that the difference between the densities of said dispersed solid and the liquid phase are substantially decreased.

3. A stable suspension adapted to be administered to mammals in non-toxic dosages, comprising: (a) a dispersed solid substance selected from the group consisting of medicinal and diagnostic agents having a density above 1.0 g./cc. and having a particle size between about 1 and 100 microns; and a dispersion medium including (b) a non-aqueous liquid having a density less than said solid, and (c) a compound dissolved in said non-aqueous liquid and containing in its molecular structure at least one iodine atom, the concentration of said compound in said liquid being such that the difference between the densities of said dispersed solid and the liquid phase are substantially decreased.

4. A stable suspension adapted to be administered to mammals in non-toxic dosages, comprising: (a) a dispersed solid hormonal substance having a density above 1.0 g./cc. and having a particle size between about 1 and 100 microns; and a dispersion medium including (b) water and (c) a compound dissolved in said water and containing in its molecular structure at least one iodine atom, the concentration of said compound in said liquid being such that the difference between the densities of said dispersed solid and the liquid phase are substantially decreased.

5. A suspension according to claim 4 in which the concentration of iodinated solute is such that the densities of the solid hormonal substance and the dispersion medium are approximately equal.

6. A suspension according to claim 4 wherein the hormonal substance is selected from the group consisting of estrone, estradiol, equilin, testosterone, progesterone, cortisone and hydrocortisone.

7. A suspension according to claim 4 wherein the iodinated solute is sodium 3,5-diacetamido-2,4,6-triiodobenzoate.

8. A stable suspension adapted to be administered to mammals in non-toxic dosages, comprising: (a) a dispersed radiopaque substance having a density above 1.0 g./cc. and having a particle size between about 1 and 100 microns; and a dispersion medium including (b) water and (c) a compound dissolved in said water and containing in its molecular structure at least one iodine atom, the concentration of said compound in said liquid being such that the difference between the densities of said dispersed solid and the liquid phase are substantially decreased.

9. A suspension according to claim 8 wherein the radiopaque substance is an ester of 3,5-diacetamido-2,4,6-triiodobenzoic acid.

10. A stable suspension adapted to be administered to mammals in non-toxic dosages, comprising: (a) a dispersed solid radiopaque substance having a density above 1.0 g./cc. and having a particle size between about 1 and 100 microns; and a dispersion medium including (b) a non-aqueous liquid having a density less than said solid radiopaque substance, and (c) a compound dissolved in said non-aqueous liquid and containing in its molecular structure at least one iodine atom, the concentration of said compound in said liquid being such that the difference between the densities of said dispersed solid and the liquid phase are substantially decreased.

11. A suspension according to claim 10 wherein the radiopaque substance is an ester of 3,5-diacetamido-2,4,6-triiodobenzoic acid.

References Cited in the file of this patent

UNITED STATES PATENTS

| | | |
|---|---|---|
| 2,600,344 | Van Meter | June 10, 1952 |
| 2,611,773 | Ott | Sept. 23, 1952 |
| 2,677,645 | Allen | May 4, 1954 |

OTHER REFERENCES

J.A.P.A., Pr. Pharm. Ed., vol. 17, No. 12, December 1955, p. 724 (diatrizoate sodium).

"Renografin," J.A.M.A., vol. 162, No. 7, October 13, 1956, p. 31.